United States Patent
Hayashi

[19]

[11] Patent Number: 6,116,289
[45] Date of Patent: Sep. 12, 2000

[54] FLEXIBLE HOSES AND JOINT STRUCTURES THEREOF

[75] Inventor: Tokujiro Hayashi, Kobe, Japan

[73] Assignee: Tigers Polymer Corporation, Osaka, Japan

[21] Appl. No.: 09/233,467

[22] Filed: Jan. 20, 1999

[30]     Foreign Application Priority Data

Jan. 20, 1998   [JP]   Japan ................................. 10-023729

[51] Int. Cl.[7] ................................................. F16L 11/11
[52] U.S. Cl. ........................... 138/122; 138/121; 138/177; 138/DIG. 11; 138/178
[58] Field of Search .................................. 138/122, 121, 138/177, 178, DIG. 11, 129, 144, 154, 173

[56]             References Cited

U.S. PATENT DOCUMENTS

| | | | |
|---|---|---|---|
| 1,740,524 | 12/1929 | Schmidt | 138/177 |
| 1,813,039 | 3/1931 | Escol | 138/121 X |
| 2,012,766 | 8/1935 | Meyer | 138/121 X |
| 2,157,564 | 5/1939 | Peuthert | 138/121 |
| 2,406,838 | 9/1946 | Kepler | 138/121 X |
| 2,695,038 | 11/1954 | Parce et al. | 138/121 X |
| 4,592,231 | 6/1986 | Kant | 138/121 X |
| 5,439,035 | 8/1995 | Dal Palu e, acu u Attilo | 138/121 |
| 5,706,864 | 1/1998 | Pfleger | 138/121 |

FOREIGN PATENT DOCUMENTS

| | | |
|---|---|---|
| 0368096 | 10/1989 | European Pat. Off. . |
| 9201997 U | 4/1992 | Germany . |
| 61-171986 | 2/1986 | Japan . |

*Primary Examiner*—Patrick Brinson
*Attorney, Agent, or Firm*—Pillsbury Madison & Sutro LLP

[57]              ABSTRACT

A flexible hose 1 of the present invention is formed by blocking and interrupting a spiral groove 5 inside a hill 2 of a corrugated hose end portion 1*a* or 1*b* (inner surface helical concave portion) to form a closed section 4, or by blocking and interrupting a spiral groove 5 formed outside a valley 3 of a corrugated end portion 1*a* or 1*b* of a hose (outer surface helical concave portion) to form a blocked section 4. The flexible hose of the present invention can provide an improved air tightness when connected to a joint, requiring no troublesome steps or treatments.

10 Claims, 5 Drawing Sheets

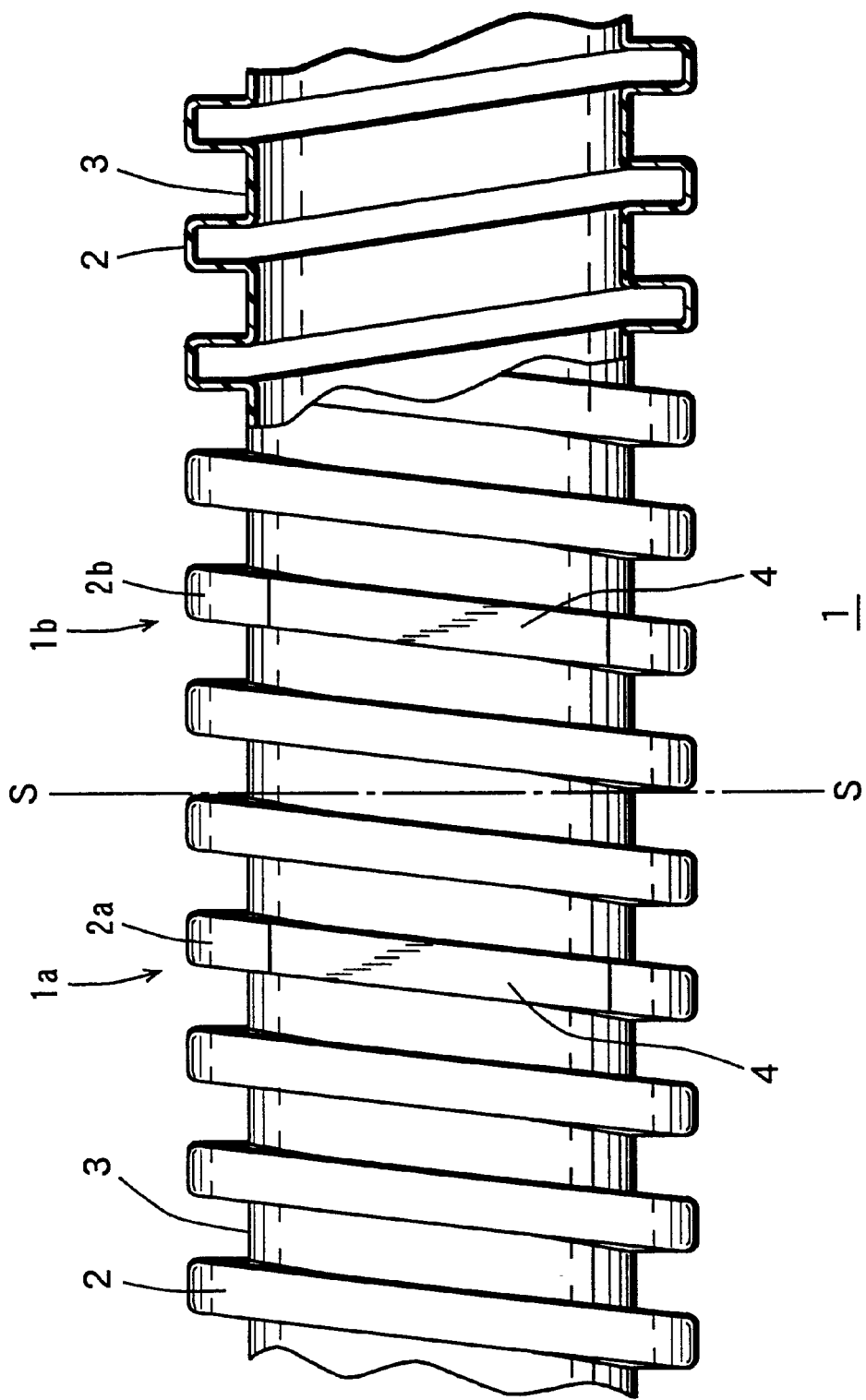

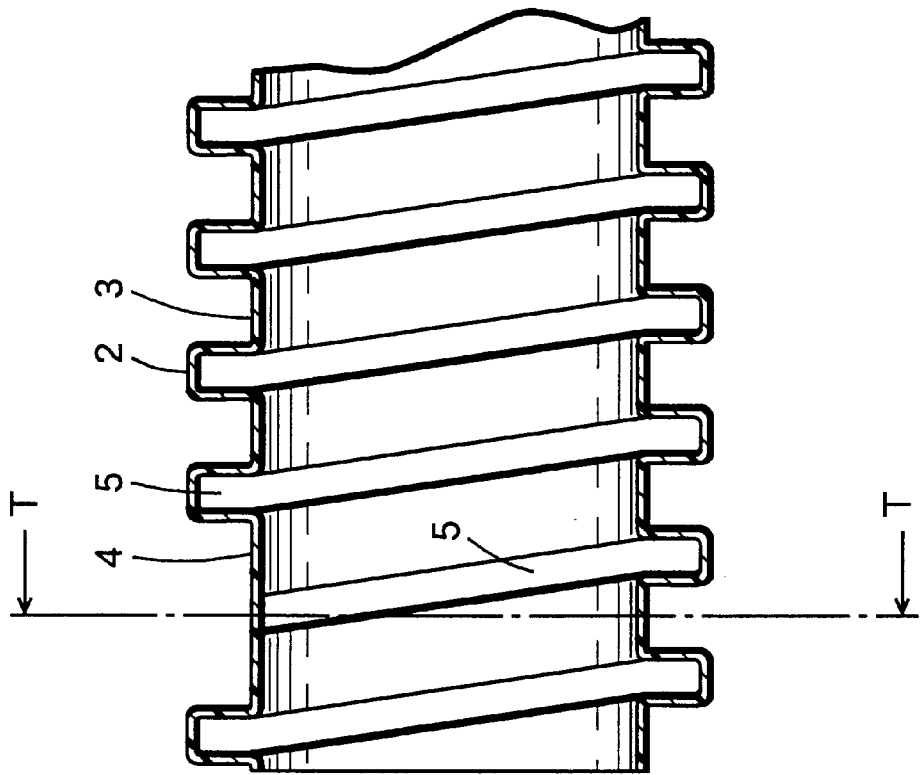
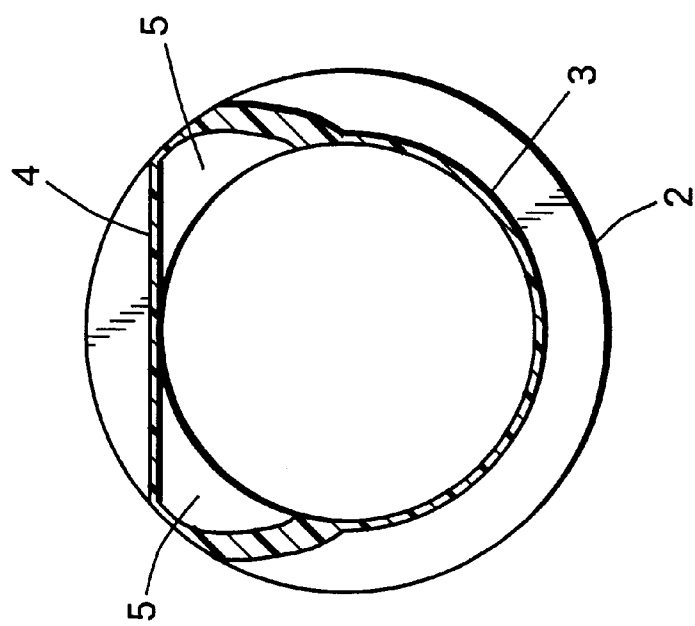
FIG. 2A
FIG. 2B

FLEXIBLE HOSES AND JOINT STRUCTURES THEREOF

FIELD OF THE INVENTION

The present invention relates to a hose having a high flexibility and useful for electric cleaners or the like, and to a joint structure between the hose and a joint.

BACKGROUND OF THE INVENTION

As disclosed in Japanese Patent Application Laid-Open No. 171986/1986 (JP-A-61-171986), as hoses of this type, there has been known a hose formed by, without a hard steel wire, molding a circumferential wall of a polyethylene or the like such as to be corrugated along the axial direction (so called conduit hoses in this field). Such hoses are not liable to be permanently deformed even if they are treaded.

However, since the wall of the conduit hose is configured such as to become corrugated relatively high to enhance its strength against crush, there has been a problem that when an end of the hose is connected firmly to a joint for a drive unit or a joint for an operation unit for an electric cleaner, a spirally or helically extending concave groove formed inside the circumferential wall acts as an air passageway slightly communicating with the outside and, therefore, inflow air from the outside reduces the suction force. To solve this problem, an annular protrusion is formed along the circumference of the joint, which an end of the hose abuts with, and the gap therebetween is sealed with an adhesive or the like. however, such sealing treatment is troublesome and inefficient.

SUMMARY OF THE INVENTION

Therefore, it is an object of the present invention to provide a flexible hose which provides an improved airtightness between a conduit hose and a joint without troublesome steps.

It is another object of the present invention to provide a flexible hose which gives, when a conduit hose and a joint are jointed each other, an improved airtightness to the joint with a simple structure simply and in an easy manner.

The inventor of the present invention made improvements on the configuration of an end of a molded hose, and found that the above objects can be achieved with simple structural improvements.

The flexible hose of the present invention is molded in the form of spiral corrugations, which comprises a spiral groove formed at least inside a hill or outside a valley, or both inside and outside a hill or valley of the corrugations of a hose end portion, and a closed or blocked section for blocking the spiral groove. Such flexible hoses can be obtained by molding synthetic resin tubes continuously extruded out from an extruder such as to be spirally corrugated by using a mold.

In the joint structures of the present invention, at a connecting region where the flexible hose and the hose joint are connected together, a closed or blocked section for blocking a spiral groove intimately contacts with the opposing surface of the hose joint.

According to the present invention, when a hose is connected to a joint, the configuration (a closed groove or a blocked groove) of a molded conduit hose itself serves as a means for complete isolation of a communication between the interior and exterior of the hose. Thus, inflow (inleak) or outflow (outleak) of air can be prevented without processing or treating the hose after having been molded.

BRIEF DESCRIPTION OF THE DRAWINGS

FIG. 1 is a partial sectional view of a hose according to the present invention.

FIG. 2 is a sectional view showing an end portion of the hose and the neighborhood thereof. Figure (A) is its side sectional view and Figure (B) is a sectional view taken along the line T—T in Figure (A).

DETAILED DESCRIPTION OF THE INVENTION

Figure 3:
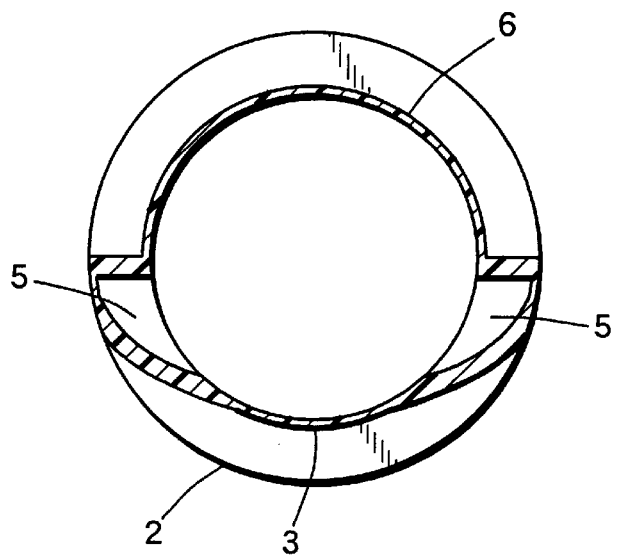
FIG. 3 is a sectional view showing another embodiment of a hose according the present invention.

Hereinafter, an embodiment of the present invention will be described in detail with reference to the drawings.

In FIG. 1, a bellows hose 1 is a corrugated hose having a hose wall unitalily molded such that hills 2 (convex portions) and valleys 3 (concave portions), which are adjoining alternately and have a predetermined thickness, spirally or helically extend throughout the whole length along its axial direction. The circumferential wall of the hose, including the hose end potions, is formed in the form of spiral or helical corrugations substantially uniform in thickness. In this embodiment, inside the hills 2, a helical groove is formed along the interior circumferential wall. To render the bellows hose 1 flexibility, it is constructed from a synthetic resin (e.g., a polyolefinic resin such as polyethylene, an ethylene-vinyl acetate copolymer, a plasticized polyvinyl chloride).

The bellows hose 1 can be produced by cutting a hose of an indefinite length, which is a continuously molded lengthy hose, into a predetermined length along the line S—S. One end left to the cutting line S—S is an end portion 1a, and the other end right to the cutting line is an end portion 1b. One of the hills 2a and 2b formed on the both end portions 1a and 1b is circumferentially collapsed for a predetermined length so that the spiral or helical groove formed on the interior circumferential wall of the hose is closed, forming a closed section 4. In other words, the convex portions (the hills 2a and 2b) formed on the end portions of the bellows hose 1 are collapsed such as to be flush with the valleys 3, and as a result, the spiral or helical groove formed on the interior circumferential wall partly disappears, and the collapsed section (the closed section 4) becomes or forms at least part of the exterior circumferential surface of the valley.

FIG. 2 shows the configuration of the end portion 1a (or 1b) and its neighborhood of the bellows hose 1 in detail. FIG. 2 (A) is a sectional view of the hose wall, and FIG. 2 (B) is a sectional view taken along the line T—T in FIG. 2 (A). As obvious from FIGS. 2 (A) (B), the end portion of the bellows hose is formed such as to have a closed section 4 (collapsed section) having a flat surface by collapsing a convex portion 2 (or a hill) to be flat and, therefore, a spiral or helical groove 5 formed inside the hill 2 along the interior circumferential wall is collapsed and closed.

In the above embodiment, the spiral or helical groove 5 is circumferentially interrupted at the closed section 4 for a relatively short length, but the spiral or helical groove may be interrupted by a section of a different configuration. Usually, the closed section is formed such as to block the spiral or helical groove in the circumferential direction. As shown in FIG. 3 as a modified embodiment thereof, the spiral or helical groove 5 may be circumferentially closed and interrupted (or blocked) around half the circumference by a closed section 6.

The closed section (or the collapsed section) need only be able to block at least part of the spiral or helical groove 5 in the circumferential direction, and the shape of the closed section may be optionally designed from the point of view of, for example, the connectability of the hose to a hose joint.

To block or shield the spiral or helical flow passageway formed between the spiral or helical groove of the flexible hose and the hose joint when they are joined or connected together, the spiral or helical groove Is blocked or interrupted by the blocked or closed section by raising a valley to be substantially level with the adjoining convex portions, or by making the hill wall low to be substantially level with the adjoining concave portions. In other words, a closed section or blocking section is formed by leveling a hill with the adjoining concave portions, or by leveling a valley with the adjoining convex portions. Moreover, the closed section can be formed, in the circumferential direction, by raising the groove wall or valley to be substantially level with the convex portions adjoining in the axial direction of the hose, or by sinking or making the hill wall (or convex portion) low to be substantially level with the concave or valley portions.

In the joint or connecting structure between the flexible hose and the hose joint, it need only be such that, at the coupling region where the flexible hose and the hose joint are joined together, the closed or blocked section for blocking the helical groove tightly fits or contacts with the opposing surface of the hose joint. According to such a structure, the spiral or helical flow passageway formed between the spiral groove of the flexible hose and the hose joint can be tightly blocked or shielded by the closed or blocked section.

Figure 5:
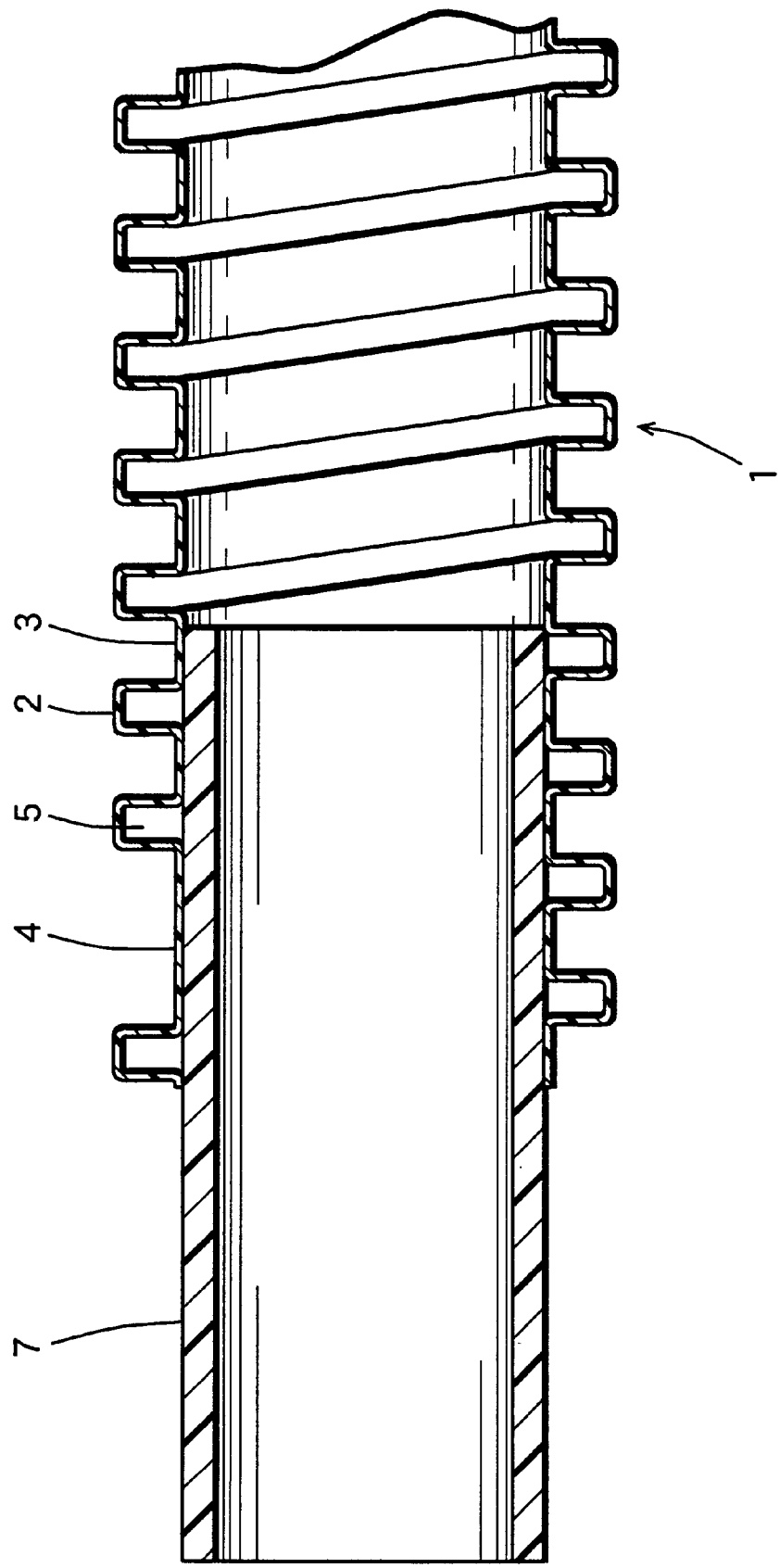
FIG. 5 is a sectional view showing the hose connected to a joint.

FIG. 5 shows a connected state with an adhesive, in which a cylindrical hose joint 7 is fitted into the end portion 1a (or 1b) of the bellows hose 1 of FIG. 2. Since the spiral or helical groove is closed or interrupted at the closed section 4, the hose can tightly contacts with the outer surface of the hose joint 7 at the closed section 4, and therefore, communication between the spiral or helical groove 5 inside the hill 2 corresponding to the closed section 4 and the turn outwardly next to the helical groove 5 of the bellows hose is prevented.

A process for molding a conduit hose comprises, as has been well known, extrusion-molding a melted or softened synthetic resin tube tubularly extruded from a die of an extruder along the axis direction, blowing air into the tube to expand it radially and, as the tube expands, coaxially passing the tube through a molding zone composed of a plurality of cylindrical molds and movable in a direction in which the tube is extruded. The cylindrical mold is composed of a pair of molding units, and the arcuate interior circumferential surface of the molding unit is formed such as to be spirally-corrugated in the longitudinal direction. Of a plurality of pairs of molding units, a plurality of molding units on one side are connected endlessly and forms a first circulation line (a first connected molding units line) that circulates in one direction, and a plurality of molding units on the other side is also connected endlessly and forms a second circulation line (a second connected molding units line) which circulates in a direction opposite to that of the first circulation line. A pairing region where the first circulation line and the second circulation line meet forms the molding zone composed of a plurality of cylindrical molds. In other words, of the molding units those circulate along the first and second circulation lines, a molding unit on one circulation line meets a molding unit on the other circulation line at the starting zone of the molding zone, forming a pair of molding units. At the terminal zone of the molding zone, the pair of molding units is separated. The molding zone moves coaxially with the extruded tube, and the circumferential wall of the tube is formed as the tube expands. The molding zone composed of such molds is disclosed in Japanese Patent Application Laid-open No. 42885/1993 (JP-A-5-42885) and Japanese Patent Laid-open No. 267409/1997 (JP-A-9-267409), incorporated herein by reference.

Figure 4:
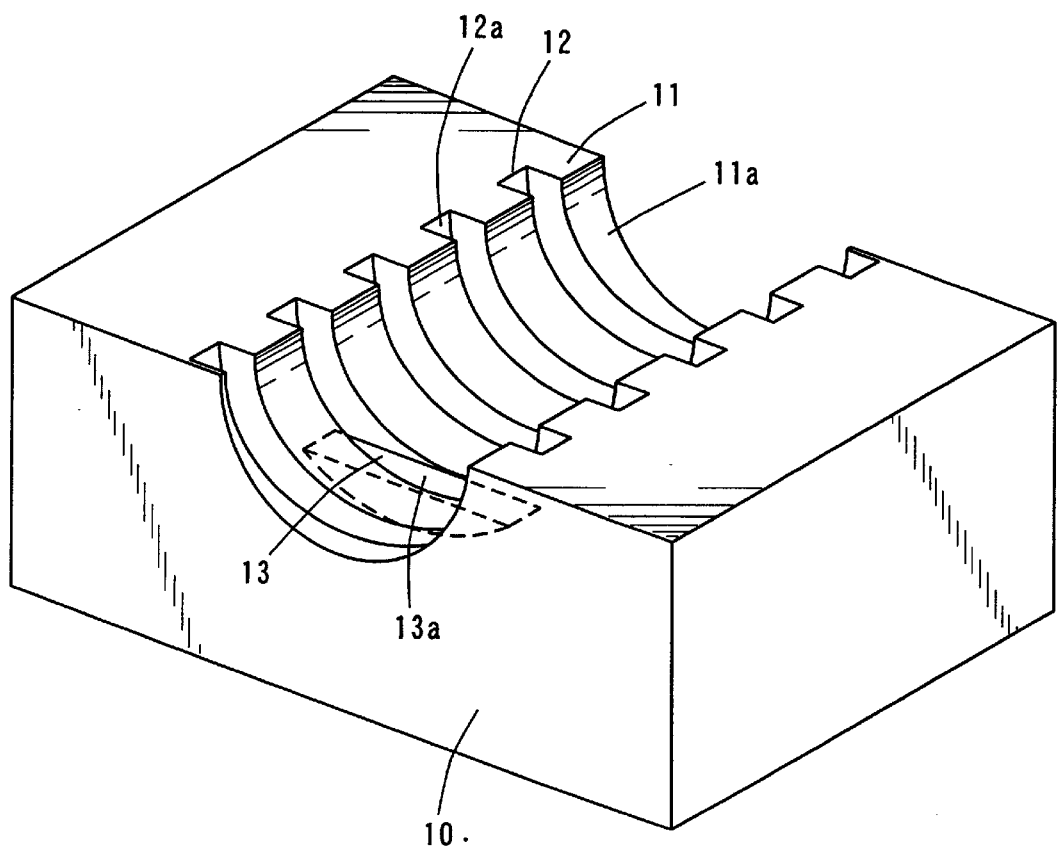
FIG. 4 is a perspective view showing one embodiment of a molding unit for molding the end portion of the hose.

FIG. 4 is a schematic perspective view showing one embodiment of a molding unit for molding the end portion 1a (or 1b) of the bellows hose 1 shown in FIG. 2.

The molding unit 10 has a cavity showing an arcuate cross section and extending in the longitudinal direction. On the surface of the cavity, spiral or helical convex portions 11 protruding in a radially inward direction and spiral or helical concave portions 12 recessed in a radially outward direction and adjoining the above convex portions are formed. Interior circumferential surfaces 11a of the convex portions 11 correspond to the exterior circumferential surfaces of the valleys 3 of the hose, and interior circumferentical surfaces 12a of the concave portions 12 correspond to the exterior circumferential surfaces of the hills 2 of the hose.

The concave portion 12 of the molding unit 10 which corresponds to the hill 2a (or 2b) on the end portion 1a (or 1b) partially protrudes, in the circumferencial direction, from the interior circumferential surface 12a in a radially inward direction to form a protruding portion having a flat surface 13. The flat surface 13 corresponds to the outer surface of the closed section 4 of the hill 2a of the hose. A center part 13a of the flat surface 13 in the circumferential direction is formed such as to be substantially level with the interior cirucumferential surfaces 11a of the adjoining convex portions, thus the surfaces of the adjoining convex portions are linked and flush with the flat surface.

In the embodiments shown in FIGS. 2 and 3, the position of the closed section 4 or 6, in the longitudinal direction of the hose, can be easily recognized from the external appearance (especially, in the case of FIG. 3). Thus, there can be obtained an advantage that a lengthy hose being molded continuously is cut at a predetermined position into a predetermined length with an automatic cutter by detecting the closed section 4 or 6 with a sensor without difficulty.

Figure 6:
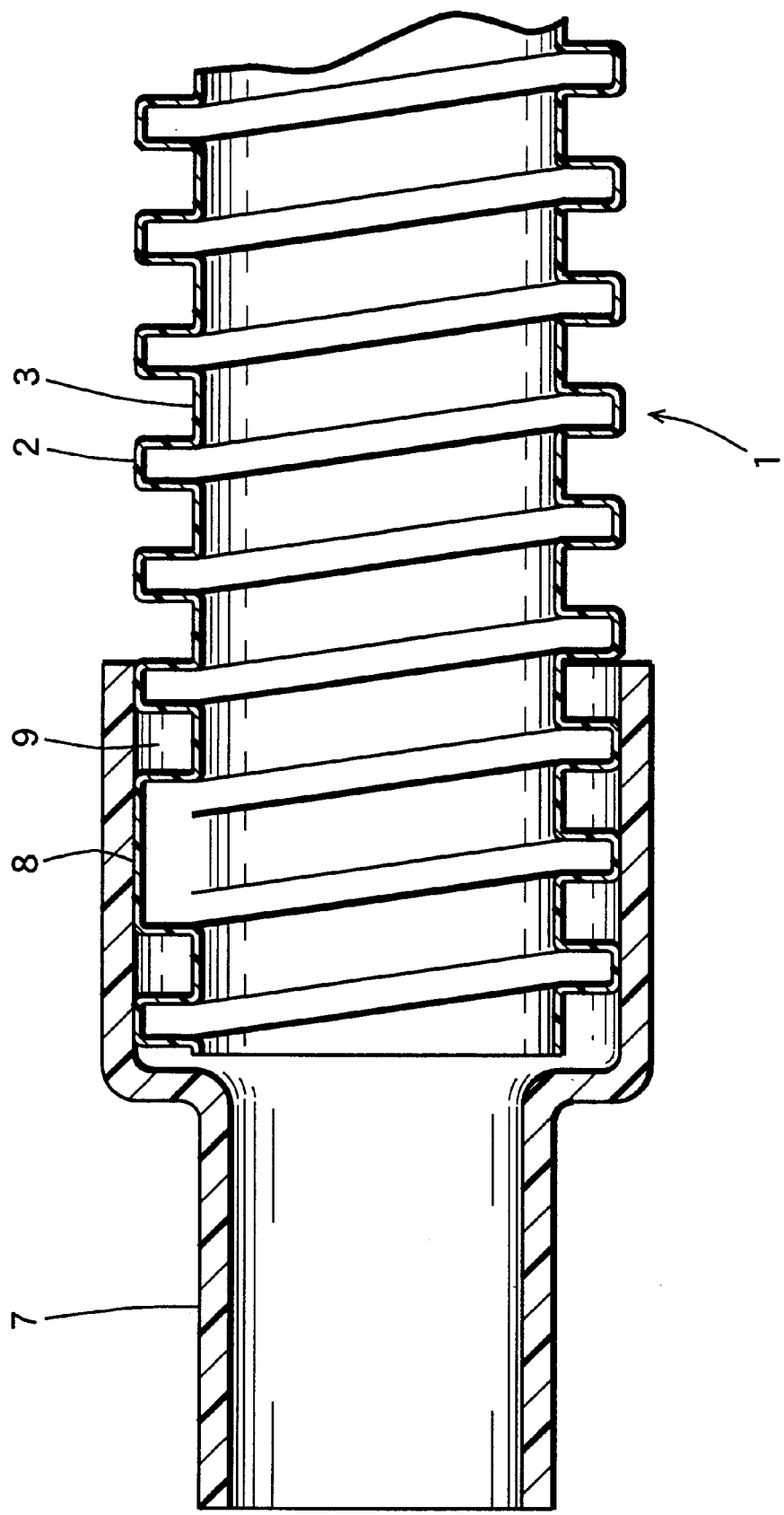
FIG. 6 is a sectional view showing a hose of another embodiment and a joint in a connected state.

FIG. 6 is a cross-sectional view of another embodiment, in the case where the bellows hose 1 is fitted into a hose joint 7 having a radially enlarged end portion and fixed with an adhesive or the like.

In this case, the bellows hose 1 is configured to have a blocked section 8 formed by raising part of a valley 3 on the end portion in a radially outward direction along the circumference, and the blocked section 8 has a surface substantially level with the hills 2 adjacent thereto for blocking or interrupting a spirally or helically extending groove 9. By tightly fitting the blocked section 8 and the inner surface of the hose joint 7, the communication of air through the groove is blocked.

The hose shown in FIG. 6 is also manufactured with the use of a molding unit similar to that explained above. In this embodiment (not shown), a convex portion of the molding unit for molding a valley of the hose is partially recessed along its circumference, and the convex portion corresponds to the outer configuration of the blocked section 8.

In the flexible hose, both spiral grooves inside the hills and outside the valleys of the corrugations formed on an end portion of the hose may be blocked. In such a flexible hose, a spiral flow passageway formed between a hose joint and the flexible hose can be blocked by the closed or blocked section regardless of whether the hose joint is connected or fitted onto or into the flexible hose. Moreover, a plurality of closed or blocked section may be formed on a different site of the end portion of the hose in the circumferential and/or axial direction.

According to the present invention, since a spiral groove on the inner or outer surface of the hose which acts as an air communication path is blocked and interrupted, there can be obtained a conduit hose capable of providing an improved airtightness, requiring no troublesome sealing treatments when connected or fitted into or onto a joint, and the hose is not liable to be deformed even if treaded. Therefore, the conduit hose of the present invention can be applied to various flexible hoses and used as, for example, a hose for an electric cleaner, an air conditioner, or the like.

What is claimed is:

1. A flexible hose which is molded in the form of spiral corrugations, which comprises spiral grooves respectively formed inside a hill and outside a valley of the corrugations of a hose end portion, and a closed or blocked section for blocking at least one of the spiral grooves.

2. A flexible hose according to claim 1, wherein the hose is formed by molding a synthetic resin tube continuously extruded from an extruder in the form of spiral corrugations with the use of a mold.

3. A flexible hose according to claim 1, wherein a circumferential wall of a hose end portion is corrugated and substantially uniform in thickness.

4. A flexible hose according to claim 1, wherein said closed or blocked section is formed to block said spiral groove in the circumferential direction.

5. A flexible hose according to claim 1, wherein said spiral groove is blocked or closed by said blocked or closed section formed by raising the said valley to be substantially level with adjoining convex portions, or by sinking or making the hill low to be substantially level with the adjoining concave portions.

6. A flexible hose according to claim 1, wherein said spiral groove is blocked or closed by said blocked or closed section, in the circumferential direction, formed by raising a groove wall or valley to be substantially level with convex portions adjoining in the axial direction of the hose, or by sinking or making a hill wall low to be substantially level with concave or valley portions.

7. A flexible hose according to claim 1, wherein both spiral grooves formed inside said hill and outside said valley of the corrugations formed on said hose end portion are closed or blocked by said closed and blocked sections.

8. A joint structure between a flexible hose according to claim 1 and a hose joint, wherein, at a connecting region where the flexible hose and the hose joint are connected together, a closed or blocked section for blocking at least one of spiral grooves intimately contacts with the opposing surface of the hose joint.

9. A joint structure according to claim 8, wherein said flexible hose is fitted onto or into said hose joint and said closed or blocked section of the flexible hose intimately contacts with the outer or inner surface of the hose joint.

10. A joint structure according to claim 8, wherein a spiral flow passageway between said spiral groove of said flexible hose and said hose joint is closed or blocked by said closed or blocked section.

* * * * *